United States Patent [19]
Umeda

[11] 3,840,884
[45] Oct. 8, 1974

[54] MOTOR DRIVEN WINDING DEVICE FOR PHOTOGRAPHIC CAMERA

[75] Inventor: Kaoru Umeda, Osaka, Japan

[73] Assignee: Minolta Camera Kabushiki Kaisha, Osaka-shi, Osaka-fu, Japan

[22] Filed: Feb. 22, 1974

[21] Appl. No.: 444,902

[30] Foreign Application Priority Data
Feb. 24, 1973 Japan.................................. 48-21761

[52] U.S. Cl................ 354/204, 354/173, 242/71.5
[51] Int. Cl........................ G03b 17/42, G03b 1/12
[58] Field of Search ............ 354/204, 173; 352/121; 242/71.5

[56] References Cited
UNITED STATES PATENTS
3,710,705   1/1973   Kimura............................ 354/204 X

*Primary Examiner*—Robert P. Greiner
*Attorney, Agent, or Firm*—Watson, Cole, Grindle & Watson

[57] ABSTRACT

A motor driven winding device for a photographic camera. An electric motor, which controls the film winding and releasing operations, is selectively connectable to a high voltage circuit, low voltage circuit or braking circuit. When the release operation for causing a continuous photographic process is effected, the electric motor is connected to the high voltage circuit for effecting the winding of the film and the cocking of the shutter. Upon the completion of the film winding and shutter cocking operations, the electric motor is disconnected from the high voltage circuit and in turn connected to the low voltage circuit, thereby rotating at a slower speed which is utilized for driving the shutter release mechanism. After causing the release of the shutter, the electric motor is disconnected from the low voltage circuit and is then connected to the braking circuit and stops. By the application of a signal representing the completion of the exposure by the shutter, the electric motor is disconnected from the braking circuit and in turn again connected to the high voltage circuit. These sequential operations are cyclically repeated. After completion of the continuous series of photographs, the film winding and shutter cocking operations for taking a subsequent photograph, at a later point in time, are effected by the electric motor connected to the low voltage circuit. Upon the termination of the winding operation in this manner, the electric motor is connected to the braking circuit, thereby stopping its driving operation.

4 Claims, 3 Drawing Figures

MOTOR DRIVEN WINDING DEVICE FOR PHOTOGRAPHIC CAMERA

BACKGROUND OF THE INVENTION

The present invention relates to a motor driven winding device for a photographic camera.

More specifically, the present invention relates to a motor driven winding device for a photographic camera of the type for taking a continuous series of photographs where it is desirable to be able to increase the number of photograph cycles per unit time while still being able to provide a comparatively long period of exposure time.

It is known that, for successively effecting the operations of winding the film, cocking the shutter and releasing the shutter for a photographic camera, the camera mechanism is driven by a motor whose operation is initiated upon actuation of the release operation. In such a motor driven photographic camera, there arises a demand for increasing the number of photograph cycles per a given period of time (hereinafter referred to as a photographic frame speed). In order to accomplish this objective, attempts have been made for increasing the voltage applied to the electric motor so as to increase the r.p.m. of the motor.

With utilizing such a procedure for increasing the photographic frame speed by increasing the voltage applied to the electric motor however, if the level of the applied voltage exceeds a certain limit, such as, for example, a voltage sufficient to produce a photographic frame speed of five, then the interruption of the release operation for terminating the continuous photographic process cannot effectively be carried out due to the inertia of the electric motor and the drive cord leading from the electric motor to the winding shaft. Accordingly, the movement of the electrically driven cord overlaps the succeeding release operation rather than stopping within the specified range of a winding operation of the cord, thereby failing to make a normal stop.

In order to solve the problem described, it has been suggested in Japanese Patent Application No. 16127 (1972), that in addition to a braking circuit, there be provided a high voltage circuit for applying high voltage to the motor and a low voltage circuit for applying low voltage thereto. The high and low voltage circuits are both adapted to be connected in such a manner that, during the release operation for the continuous photographic process, the high voltage circuit is normally connected to the electric motor, and upon the interruption of the release operation, the low voltage circuit is connected to the electric motor for effecting the film winding and shutter cocking operations for taking a succeeding photograph. Upon completion of these operations, the connection between the electric motor and the low voltage circuit is switched to the connection of the braking circuit to the electric motor, whereby the electric motor is stopped at a desired position.

While the proposal suggested by the above-noted application does provide for a higher frame-winding speed than previously obtainable, such a system still suffers from some drawbacks. During the release operation, the high voltage circuit is normally maintained connected to the electric motor, the shutter releasing and film winding operations, therefore, are alternately and cyclically effected and, therefore, the period of time from the releasing of the shutter until the commencement of the winding of the film of the subsequent cycle is limited to a given duration of time. Accordingly, it is necessary that the exposure be completed within the duration of this time period. The shutter speed, therefore, may cause this duration to be decreased to less than approximately 1/250 second. The shutter speed however cannot always be reduced to a value less than approximately 1/250 second since it would then become impossible to automatically control the shutter speed in dependence upon the brightness of the photographic object.

SUMMARY OF THE INVENTION

An object of the present invention is to provide a motor driven winding device for a photographic camera, in which the photographic frame speed in a continuous photographic process is increased and the time of the exposure in the process can be set at any desired value.

Another object of the present invention is to provide a motor driven winding device for a photographic camera, wherein a desired exposure time is arbitrarily selected, the photographic frame speed is increased during the release operation for the continuous photographic process and upon the interruption of the release operation, the camera may be normally stopped in a condition where the film winding and shutter cocking operations have been completed.

A further object of the present invention is to provide a motor driven winding device for a photographic camera, wherein there are provided a driving motor, a high voltage circuit for rotating the driving motor at high speed, a low voltage circuit for rotating the driving motor at low speed and a short-circuit for braking the driving motor. The selective connection of those electric circuits with the driving motor are controlled by the motion of the camera mechanism in such a manner as to increase the photographic frame speed in the continuous photographic process as well as permitting the exposure time in the process to be set at any desired value.

In order to attain these objectives, the present invention provides a motor driven winding device for a photographic camera, in which the following elements are provided: an electric motor for driving a film winding mechanism, a shutter cocking mechanism and a shutter releasing mechanism, a high voltage circuit, a low voltage circuit and a braking circuit. In the operation of this system, when the release operation for the continuous photographic process has been actuated, the driving motor is connected to the high voltage circuit for driving the film winding and shutter cocking mechanisms. Upon the termination of the film winding and shutter cocking operations, the driving motor is disconnected from the high voltage circuit and the electric motor in turn is connected to the low voltage circuit, with the motor then driving the shutter releasing mechanism. After commencement of the shutter releasing operation, the driving motor is cut off from the low voltage circuit and in turn connected to the braking circuit thereby causing it to stop. This connection of the motor with the braking circuit is subsequently cut off in response to the application of signals issued upon termination of the exposure by means of the shutter. The driving motor is then again connected to the high voltage circuit for a subsequent cycle of the film winding and shutter cocking operations. This procedure is cyclically repeated.

After completion of the photographic series, when the system is to be set up so as to be ready for a subsequent process, the film winding and shutter cocking operations are effected after the termination of the first shutter release after the completion of the release operation. These winding and cocking operations are effected by the driving motor which is now connected to the low voltage circuit. Upon completion of the film winding operation, the electric motor is connected to the braking circuit, thereby coming to a stop.

The high voltage circuit, when connected to the electric motor, serves to feed a high voltage to the motor for providing a high speed rotation of the motor. Consequently, during the release operation in the continuous photographic process, the film winding and shutter cocking operations are effected by the electric motor rotating at a high speed, thereby increasing the photographic frame speed.

The low voltage circuit, when connected to the electric motor, serves to feed a low voltage to the motor for providing a low speed rotation of the driving motor. The connection of the low voltage circuit with the driving motor is maintained for a duration after the completion of the film winding and shutter cocking operations until the commencement of the shutter release, thereby minimizing the inertia of the camera mechanism which results from the high speed rotation of the motor during the film winding operation.

The braking circuit, when connected to the driving motor, is used to short-circuit both terminals of the driving motor, so as to stop the rotation of the motor. The braking circuit is maintained connected to the driving motor for the interruption of its rotation for a duration from the commencement of the exposure until the termination of the exposure. This permits an exposure time to be selected at any desired value.

When the releasing operation for the continuous photographic process is interrupted, the subsequent film winding and shutter cocking operations for a subsequent process, which occur after the termination of the first shutter releasing operation after the termination of the releasing operation, no longer have any relation to the photographic frame speed. The film winding and shutter cocking mechanisms for these subsequent operations may be driven by the motor connected to the low voltage circuit so as to rotate at a lower speed. Upon the termination of the film winding and shutter cocking operations, the driving motor may be positively stopped.

DETAILED DESCRIPTION OF THE PREFERRED EMBODIMENTS

Figure 1:
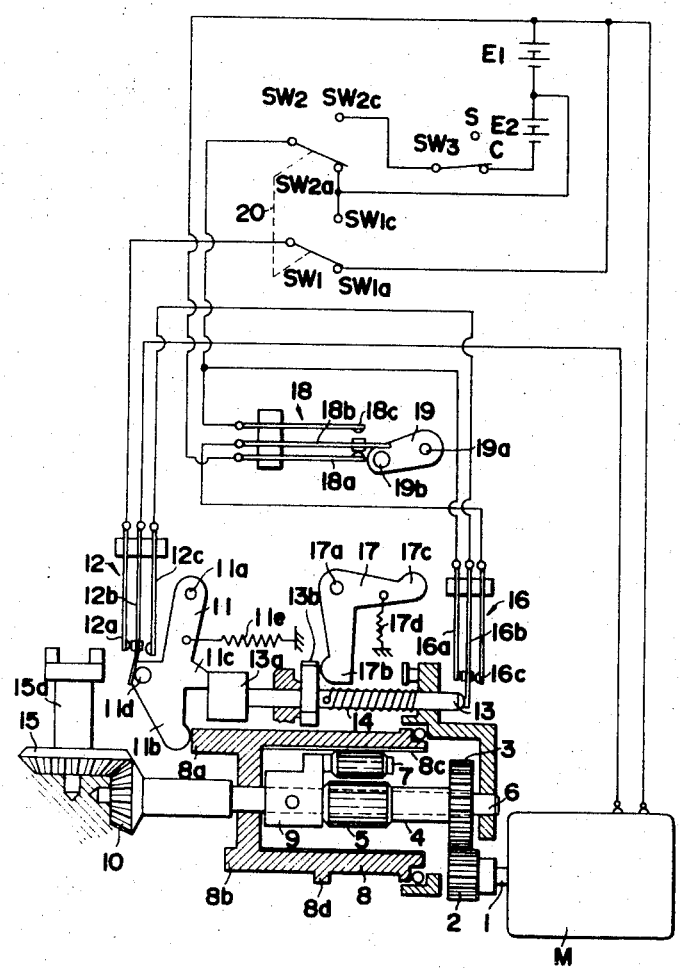
FIG. 1 is a side elevational view, with a portion being cut away, showing a construction of a preferred embodiment of the camera releasing mechanism of the present invention and a schematic diagram of an electric circuit of such mechanism.

A first embodiment of the camera mechanism of the present invention is illustrated in FIG. 1. In this system dry cells E1 and E2, which are connected in series, serve as an electric potential source. The low voltage, which is to be applied to electric motor M, is taken from potential source E1, while the high voltage to be applied is taken from the combined potential source E1 and E2, thereby driving motor M. The electric driving motor M is utilized for sequentially controlling the shutter release, film winding and shutter cocking operations.

The mode of operation of this system is determined by selective actuation of the switches SW1 and SW2. Switches SW1 and SW2 are switched from contacts SW1a and SW2a to contacts SW1c and SW2c, respectively, by means of a member 20, which is interconnected to the release button (not shown) which is biased downwardly.

Switch SW2 serves to switch between a continuous photographic mode and a mode in which only one frame is photographed at a time for a selected duration, during which the release button is being downwardly pressed. In the situation where one frame is to be photographed, switch SW3 is connected to contact S, with the negative terminal of the electric potential source E2 and the contact SW2c of switch SW2 being normally maintained in a cut-off condition.

Switches 12, 16 and 18 are constructed so as to be actuated by the camera mechanism which is driven by motor M.

Referring in detail to the camera mechanism, gear 3 is rigidly connected to sleeve 4 in which shaft 6 is loosely fitted. Shaft 6 is journaled in the camera body. The gear 3 is maintained in a meshing arrangement with driving gear 2, which in turn is rigidly connected with driving shaft 1, which is driven by motor M. The sleeve is provided with a sun gear 5, which is rigidly mounted around the sleeve 4. Cylindrical member 8, in which shaft 6 is loosely fitted, is rotatably supported in a ball bearing support or the like to the camera body. The cylindrical member 8 has an internal gear 8c provided on the inner surface of the member. At one end face of member 8, a cam face including a relatively large lug 8a and small lug or lower portion 8b are provided and around the periplery of the member, projection 8d is provided projecting radially from the outer surface. Also in the inside of member 8, a planetary gear 7 is rotatably journaled on bracket 9 which in turn is rigidly mounted on shaft 6. The planetary gear 7 is arranged in a meshing relationship with the sun gear 5 and together with the internal gear 8c of cylindrical member 8 constitute differential gears.

Figure 2:
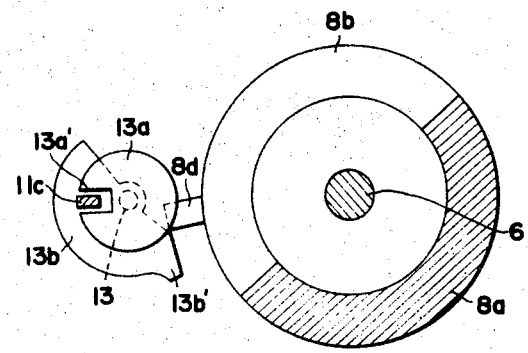
FIG. 2 is a side elevational view of the cylindrical member and the actuating shaft shown in FIG. 1.

Outside of the cylindrical member 8, a bevel gear 10 is rigidly mounted on shaft 6, with which is meshed a bevel gear 15, which in turn is rigidly mounted on a film winding shaft 15a. Provided in parallel relation to shaft 6 and rotatably and slidably journaled in the camera body is actuating shaft 13. Shaft 13 assumes a first position, i.e., a leftwardly urged position as viewed in FIG. 1, under the resiliency of coil spring 14, which has one end rigidly secured to the camera body. The right-hand end of shaft 13 is in engagement with a movable contact 16b of switch 16, so as to cause contact 16b to be normally in contact with contact 16a. When acutating shaft 13 is moved towards the right to a second position, movable contact 16b is moved so as to now contact 16c. The actuating shaft 13 has a cam plate 13a rigidly mounted on its left-hand end and a cam 13b rigidly mounted approximately in the middle of the shaft. As shown in FIG. 2, cam 13b has a projection 13 b' which is arranged so as to be engageable with projection 8d of cylindrical member 8.

An actuating lever 11 is rotatably journaled on a shaft 11a relative to the camera body. The actuating lever 11 is biased so as to be urged in the counterclockwise direction under the action of a strong spring 11e. Actuating lever 11 has contacting portion 11b which abuts on cam faces 8a, 8b of cylindrical member 8, projection portion 11c which is brought into abutment on cam plate 13a for moving the actuating shaft 13 towards the right to the second position, against the force of the coil spring 14, and pin 11d which engages the center movable contact 12b of switch 12. When contacting portion 11b engages in an abutting relationship with lug 8a of the cam face, pin 11d causes the movable contact 12b to contact contact 12a. Alternatively, when contacting portion 11b is brought into engaging and abutting relationship with the relatively small lug 8b, pin 11d causes contact 12b to contact contact 12c.

A release lever 17 is rotatably journaled on a shaft 17a relative to the camera body. The release lever 17 is biased so as to be urged in the clockwise direction under the action of a weak spring 17d. The release lever has an arm 17b, which engages in an abutting relationship with a cam plate 13b. When actuating shaft 13 is moved to the second position from the first position, the release lever 17 is urged in a counterclockwise direction against the force of spring 17d and thereby its arm 17c places the camera into a condition for taking photographs and additionally causes the shutter release operation.

Under such a condition, contacting portion 11b of actuating lever 11 is brought into engagement with the lower portion 8b of the cam face, with projection 11c urging the actuating shaft 13 towards the right to the second position from the first position, against the force of coil spring 14, thereby effecting the shutter release. When the cylindrical member 8 is rotated so as to bring its projection 8d into engagement with cam 13b as shown in FIG. 2, so as to rotate actuating shaft 13 in a clockwise direction as viewed in FIG. 2, against the force of coil spring 14, projection 11c of actuating lever 11 enters groove 13a' in cam plate 13a for engagement therewith, thereby allowing actuating shaft 13 to be forced towards the left into the first position as shown in FIG. 1, under the action of coil spring 14.

Switch 18 has a movable contact 18b which engages pin 19b of lever 19 which is designed so as to be rotated in a clockwise direction upon completion of the exposure. Movable contact 18b, which is brought into contact with contact 18a prior to completion of the exposure, is caused to contact contact 18c upon completion of the exposure. Lever 19 is rotatably journaled on shaft 19a relative to the camera body and is designed so as to be urged in the clockwise direction, as set forth, prior to termination of the travel of an exposure terminating member, not shown, such as, for example, a rear curtain of a shutter.

The motor driven winding device of the present invention having such an arrangement is in the position illustrated in FIG. 1, before the release operation is effected. In association with the downward movement of the release button, switch SW1 is caused to be switched into contact with contact SW1c from contact SW1a, and switch SW2 is turned from contact SW2a to contact SW2c, while motor M is connected through switch 12 to the electric potential source E1. In other words, a circuit is completed including potential source E1 (the positive side), motor M, movable contact 12b and contact 12a of switch 12, contact SW1c of switch SW1 and electric potential source E1 (the negative side), whereby motor M is driven at a low speed by means of the low voltage circuit which is energized by a single electric potential source E1. At this time, since the film winding has been terminated, the load to be exerted on bevel gear 10 is high, such that the shaft 6 is not able to be rotated, while cylindrical member 8 is caused to rotate. Consequently, the relatively small lug or lower portion 8b of the cam face comes into abutment with contacting portion 11b from the large lug 8a. This causes the rotation of actuating lever 11 in a counter-clockwise direction, whereby pin 11d turns switch 12 so as to come into contact with contact 12c and also turns switch 16 so as to contact contact 16c, thereby actuating release lever 17.

Thus, one terminal of motor M is short-circuited, through switch 12, from contact 12c to contact 16c of switch 16 and through contact 18a of switch 18, to the other terminal, whereby motor M is braked for a sudden stop.

Upon termination of the exposure, switch 18 is turned so as to contact with contact 18c, thereby connecting the high voltage circuit to motor M. This high voltage circuit includes potential source E1 (the positive), contact 12c of switch 12, contact 16c of switch 16, contact 18c of switch 18, contact SW2c of switch SW2 and potential source E2 (negative), thereby driving motor M at a high speed for causing the rotation of cylindrical member 8 by way of driving shaft 1. Consequently, projection 8d of cylindrical member 8 is brought into engagement with projection 13b' of cam 13b, so as to rotate actuating shaft 13 in the clockwise direction as viewed in FIG. 2. The rotation of the actuating shaft 13 continues until projection 11c engages in groove 13a' in cam plate 13a, as shown in FIG. 2, thereby causing actuating shaft 13 to be urged towards the left to the first position under the action of the coil spring action 14. The movement of actuating shaft 13 enables release lever 17 to rotate in a clockwise direction for returning to its initial position.

After the subsequent winding operation, the film locking mechanism is unlocked and switch 16 is turned so as to contact with contact 16a. The high voltage circuit is still connected to motor M, which circuit includes potential source E1 (positive), contact 12c of switch 12, contact 16a of switch 16, contact SW2c of switch SW2 and potential source E2 (negative), such that motor M is driven at a high speed. Motor M, operating at such a speed, causes the rotation of shaft 6, whose load is now reduced, whereby the film winding and shutter cocking operations are completed. The decrease in the load on shaft 6 is due to the release of the shutter thereby enabling the subsequent winding to occur.

At this time, switch 18 is again turned to contact with contact 18a, but the high voltage circuit is still maintained in connection with motor M, in the manner as already set forth. Upon completion of the film winding operation, the load to shaft 6 abruptly increases. Since driving shaft 1 continues to rotate cylindrical member 8, contacting portion 11b of actuating lever 11 is forced to ride on lug 8a of the cam face. Consequently, actuating lever 11 is caused to rotate in a clockwise direction, to thereby disengage its projection 11c from groove 13a' in cam plate 13a, whereby actuating shaft 13 is urged in a counter-clockwise direction to its initial, or home, position under the action of coil spring 14, and switch 12 is turned to contact with contact 12a. This is the same condition as described earlier in conjunction with FIG. 1. Thus, the low voltage circuit in turn is connected to motor M, and the shutter release is effected by motor M driven at a low speed. The operations for this continuous photographic process are cylically repeated.

If the release operation is interrupted during the continuous photographic process and if such an interruption is effected prior to the termination of the film winding operation, switch SW2 is switched from contact with contact SW2c in which contact position the high voltage circuit was connected to motor M through switch SW2 connected to contact SW2c, into contact with contact SW2a, such that the low voltage circuit is in turn connected to motor M so as to slow down the rotation of motor M. When the film winding operation is completed and switch 12 is turned into contact with contact 12a, switch SW1, which has been in contact with contact 12a, short-circuits the motor circuit M, thereby braking motor M so as to stop it, whereby immediately before release lever 17 is actuated, the camera mechanism is stopped so as to provide for a subsequent release operation.

In the case where only one frame is to be photographed at a time, switch SW3 is maintained in contact with contact S, switch SW1 is thrown into contact with contact SW1c by the release operation, whereby motor M is connected through contact 12a of switch 12 to electric potential source E1 (positive), and the shutter release is effected by motor M which is driven at a low speed. During the exposure operation, switches 12 and 16 are switched into contact with contacts 12c and 16c, respectively, to thereby constitute a braking circuit. After completion of the exposure, switch 18 is connected to contact 18c and switch SW2 is turned into contact with contact SW2a due to the interruption of the release operation, such that the film winding and shutter cocking operations are effected by motor M driven by the low voltage circuit. Upon completion of the film winding operation, when switches 12, 16 and 18 are all switched into contact with contacts 12a, 16a and 18a, respectively, switch SW1, which is connected to contact SW1a, completes the braking circuit, thereby stopping motor M.

Figure 3:
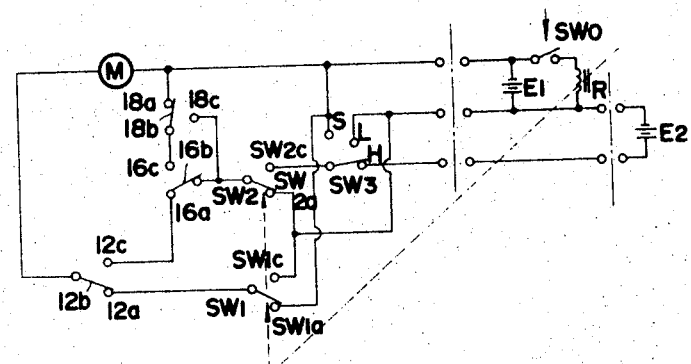
FIG. 3 is a schematic diagram of an electric circuit according to another embodiment of the present invention.

FIG. 3 shows a circuit diagram of a second embodiment of the present invention, in which relay R is provided, in place of member 20, with relay R being interconnected with the release button of FIG. 1. The relay R is actuated by switch SWc which is designed as to be normally opened and to be closed in association with the release operation. The previously described switches SW1 and SW2 are turned by relay R from contacts SW1a and SW2a to contacts SW1c and SW2c, respectively. Switch SW3, besides contact S for the one frame photographic mode, has contacts H and L which are used for the continuous photographic mode. When switch SW3 is connected to contact H, the film winding and shutter cocking in the continuous photographic process are effected by motor M driven through the high voltage circuit, in the same manner as in the first embodiment. When switch SW3 is in contact with contact L, the film winding and shutter cocking are effected by motor M driven by the low voltage circuit, thereby decreasing the photographic frame speed.

It will be understood that the above description is merely illustrative of preferred embodiments of the invention. Additional modifications and improvements utilizing the discoveries of the present invention can be readily anticipated by those skilled in the art from the present disclosure and such modifications and improvements may fairly be presumed to be within the scope and purview of the invention as defined by the claims that follow.

What is claimed is:

1. In a motor driven winding device for a photographic camera including a winding mechanism for effecting the winding of a film and cocking of a shutter, a shutter release member for releasing the shutter for enabling exposure of the film, a driving motor for driving the winding mechanism and the shutter release member, the driving motor having two input terminals, and a member for energizing the driving motor and effecting a release operation for actuating a continuous photographic process, the improvement wherein the device further comprises:

a high voltage circuit including an electric potential source of a high voltage for applying such high voltage to said driving motor;

a low voltage circuit including an electric potential source of a low voltage for applying such low voltage to said driving motor;

a braking circuit for short-circuiting both of said terminals of said driving motor;

first switch means for connecting said low voltage circuit to said driving motor for driving said shutter release member when said release member is actuated;

second switch means for cutting off the connection of said driving motor with said low voltage circuit and for connecting said driving motor to said braking circuit, in association with the operation of said shutter release member;

third switch means for cutting off the connection between said driving motor and said braking circuit and connecting said driving motor to said high voltage circuit in response to receipt of a signal indicating the completion of the exposure operation of said shutter, thereby driving said winding mechanism; and fourth switch means for cutting off the connection of said driving motor with said high voltage circuit and connecting said driving motor to said low voltage circuit, in association with the termination of winding of one frame of a photographic film and corresponding cocking of the shutter, thereby driving the motor for the shutter release operation.

2. A motor driven winding device for a photographic camera as defined in claim 1, wherein said low voltage electric potential source includes a first electric potential source and said high voltage electric potential source includes said first electric potential source and a second electric potential source connected in series with said first electric potential source.

3. A motor driven winding device for a photographic camera as defined in claim 1, further comprising:

means for transmitting the rotation of said driving motor selectively to the shutter releasing member and the winding mechanism; and, control means for selectively connecting said high voltage circuit, said low voltage circuit and said braking circuit to said driving motor, said control means including: said second switch means having a first switch and a second switch which are actuated by said transmitting means to switch said driving motor from its connection with said low voltage circuit into connection with braking circuit, said third switch means having a third switch actuated in response to receipt of a signal indicating the completion of the exposure operation and switching said driving motor from its connecting with said braking circuit into connection with said high voltage circuit, and means for causing said first switch to return to its initial position in response to further actuation of said transmitting means, for switching said driving motor from its connection with said braking circuit into connection with said high voltage circuit, in association with the termination of the winding operation.

4. A motor driven winding device for a photographic camera as defined in claim 1, further comprising:

control means for selectively connecting said high voltage circuit, said low voltage circuit and said braking circuit to said driving motor for providing the exposure for a subsequent frame of photographic film, after the interruption of the release operation;

fifth switch means for cutting off the connection of said driving motor with said braking circuit and connecting said low voltage circuit to said driving motor, when the release operation has been interrupted, for driving the winding mechanism in response to a signal indicating completion of the exposure; and, sixth switch means for cutting off the connection of said driving motor with said low voltage circuit and connecting said braking circuit to said driving motor when the release operation has been interrupted and after the film winding and shutter cocking operations have been finished by the operation of said winding mechanism.

\* \* \* \* \*